United States Patent
Xu et al.

(10) Patent No.: US 7,791,216 B2
(45) Date of Patent: Sep. 7, 2010

(54) METHOD AND SYSTEM FOR USE WITH A VEHICLE ELECTRIC STORAGE SYSTEM

(75) Inventors: Jack Xu, Northville, MI (US); Jing Song, Novi, MI (US); Anthony Phillips, Northville, MI (US); Michael Tamor, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 1023 days.

(21) Appl. No.: 10/904,252

(22) Filed: Nov. 1, 2004

(65) Prior Publication Data

US 2006/0097575 A1    May 11, 2006

(51) Int. Cl.
*B60L 11/18* (2006.01)
*H02J 7/00* (2006.01)
(52) U.S. Cl. ..................................... 307/9.1
(58) Field of Classification Search ............... 307/9.1; 320/103
See application file for complete search history.

(56) References Cited

U.S. PATENT DOCUMENTS

| | | | |
|---|---|---|---|
| 5,318,142 A * | 6/1994 | Bates et al. ............ | 180/65.2 |
| 5,552,681 A | 9/1996 | Suzuki et al. | |
| 5,705,859 A | 1/1998 | Karg et al. | |
| 5,969,624 A | 10/1999 | Sakai et al. | |
| 6,175,217 B1 * | 1/2001 | Da Ponte et al. ............ | 322/19 |
| 6,268,666 B1 | 7/2001 | Bhowmik | |
| 6,394,209 B1 | 5/2002 | Goehring et al. | |
| 6,559,621 B2 * | 5/2003 | Corless et al. ............ | 320/103 |
| 6,580,977 B2 | 6/2003 | Ding et al. | |
| 6,713,894 B1 * | 3/2004 | Reimer et al. ............ | 307/10.1 |
| 6,777,909 B1 * | 8/2004 | Aberle et al. ............ | 320/104 |
| 6,809,502 B2 * | 10/2004 | Tsujii et al. ............ | 320/150 |
| 6,861,767 B2 * | 3/2005 | Amano et al. ............ | 307/10.1 |
| 6,995,480 B2 * | 2/2006 | Amano et al. ............ | 307/10.1 |
| 2002/0074985 A1 | 6/2002 | Matsui et al. | |
| 2002/0139593 A1 | 10/2002 | Charaudeau et al. | |
| 2002/0190695 A1 | 12/2002 | Wall et al. | |
| 2003/0184256 A1 | 10/2003 | Kopf et al. | |
| 2005/0067999 A1 | 3/2005 | Okamura et al. | |
| 2008/0277173 A1 * | 11/2008 | Midrouillet et al. ......... | 180/65.1 |

FOREIGN PATENT DOCUMENTS

EP          1 366 948 A1      12/2003
WO          WO 03/061104 A1    7/2003

* cited by examiner

*Primary Examiner*—Jared Fureman
*Assistant Examiner*—Adi Amrany
(74) *Attorney, Agent, or Firm*—David B. Kelley; Brooks Kushman P.C.

(57) ABSTRACT

A method and system for controlling a vehicle having an electric powertrain and an electric energy storage system. The electric energy storage system includes a capacitor, DC/DC converter, and a battery. The electric energy storage system is controlled to maximize use of the capacitor relative to use of the battery.

15 Claims, 3 Drawing Sheets

METHOD AND SYSTEM FOR USE WITH A VEHICLE ELECTRIC STORAGE SYSTEM

BACKGROUND OF THE INVENTION

1. Field of the Invention

The present invention relates generally to powertrain hybrid electric and electric vehicles having an electric storage system (ESS).

2. Background Art

In a hybrid electric vehicle powertrain with an electric energy storage sources (ESS), electric power can flow between the powertrain and the ESS. In some cases, the power flows to the ESS for storage. In other cases, the power flows to the powertrain for consumption.

U.S. Pat. No. 5,318,142 discloses one configuration for an ESS. It describes a system having a battery and a supercapacitor connected to a bus by separate energy conversion and control devices. The separate conversion and control devices add cost and control complexity to the system. It would be desirable to eliminate one or both of these devices.

Another shortcoming of the configuration of the ESS of the '142 patent is that it fails to maximize usage of the capacitor. Maximum capacitor usage is desirable because of the performance advantages of a capacitor relative to a battery. In particular, a capacitor has better charge and discharge rates and efficiencies relative to a battery. Further, less frequent charging and discharging of a battery increases its life expectancy.

SUMMARY OF THE INVENTION

The present invention relates to a vehicle having a hybrid electric or electric powertrain and an electric energy storage system (ESS). The powertrain includes structures and features that allow the vehicle to use electric power for driving. Typically, the powertrain consists of an electric power generation unit and an electric drive unit.

The powertrain can receive power from the ESS, which converts it to mechanical power to drive the vehicle. In addition, the powertrain can generate electric power, using a fuel cell or an internal combustion engine, for powering a generator. Power can be generated also by regenerative braking. The power is provided to the ESS for storage.

The present invention includes a battery, a capacitor, and a DC/DC converter. The DC/DC converter is controllable by a vehicle system controller to control power flow between the powertrain and the ESS. This controls the powertrain and the DC/DC converter to maximize capacitor usage relative to battery usage.

In accordance with one aspect of the present invention, capacitor usage is maximized by controlling power flow to and from the battery. Capacitor usage can be maximized by controlling the DC/DC converter to prevent discharging of the battery until after the capacitor has been discharged to a low discharge threshold. In addition, capacitor usage can be maximized by controlling the DC/DC converter to prevent charging of the battery until after the capacitor has been charged to a high charge threshold.

Another aspect of the present invention relates to calculating an ESS power demand for maintaining the state of charge (SOC) of the ESS that may change due to ESS charge and discharge during vehicle operation. The ESS power demand can be used by the vehicle system controller to control the electric powertrain and the DC/DC converter. The electric powertrain can be controlled to provide power to the ESS if the ESS power demand is positive, and to accept power from the ESS if the ESS power demand is negative. Simultaneously, the controller can control the DC/DC converter to maximize capacitor usage during charging/discharging of the ESS. Power demand can be based both on capacitor state of charge (SOC) and battery SOC.

An aspect of the present invention relates to utilizing the capacitor in the ESS to compensate for a transient nature of vehicle operation in which a constantly changing motor power demand makes it difficult to quickly balance power from an electric generator unit with a power demanded by a motor. In particular, the capacitor is charged and discharged prior to charging and discharging the battery so as to maximize capacitor usage. This increases battery life and makes it possible to use a smaller battery.

One advantage of the present invention is that it includes an electric energy storage system (ESS) that includes fewer controllers.

Another advantage of the present invention is that it maximizes capacitor usage and takes advantage of the greater durability and charging/discharging power capabilities of the capacitor relative to the battery.

DETAILED DESCRIPTION OF THE PREFERRED EMBODIMENT(S)

Figure 1:
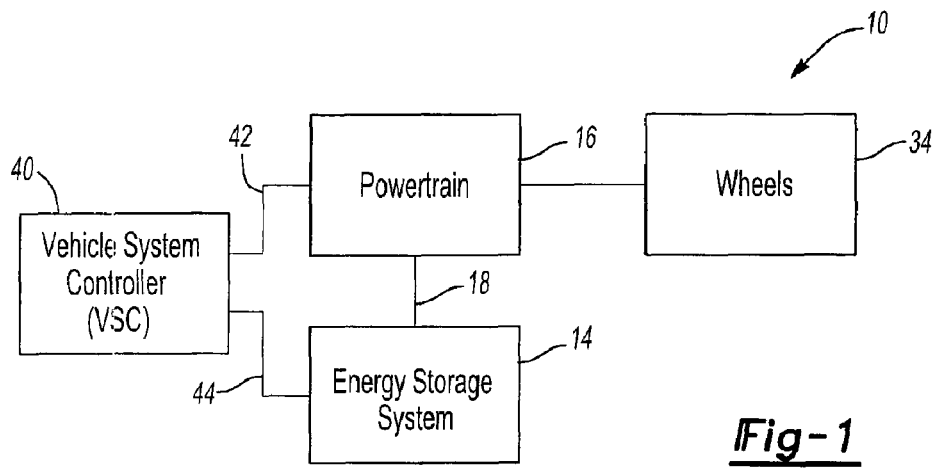
FIG. 1 illustrates a schematic diagram of a vehicle having a powertrain and an electric energy storage system.

FIG. 1 illustrates vehicle 10 having electric energy storage system (ESS) 14 in electric communication with powertrain 16 over bus 18. The ESS 14 can be configured for operation with hybrid or a purely electric vehicle powertrain 16, including a series hybrid vehicle (SHEV), a parallel hybrid vehicle (PHEV), a parallel-series hybrid vehicle (PSHEV), or a fuel cell hybrid vehicle (FCHEV). The scope of the present invention, however, is not limited to these configurations.

Figure 2:
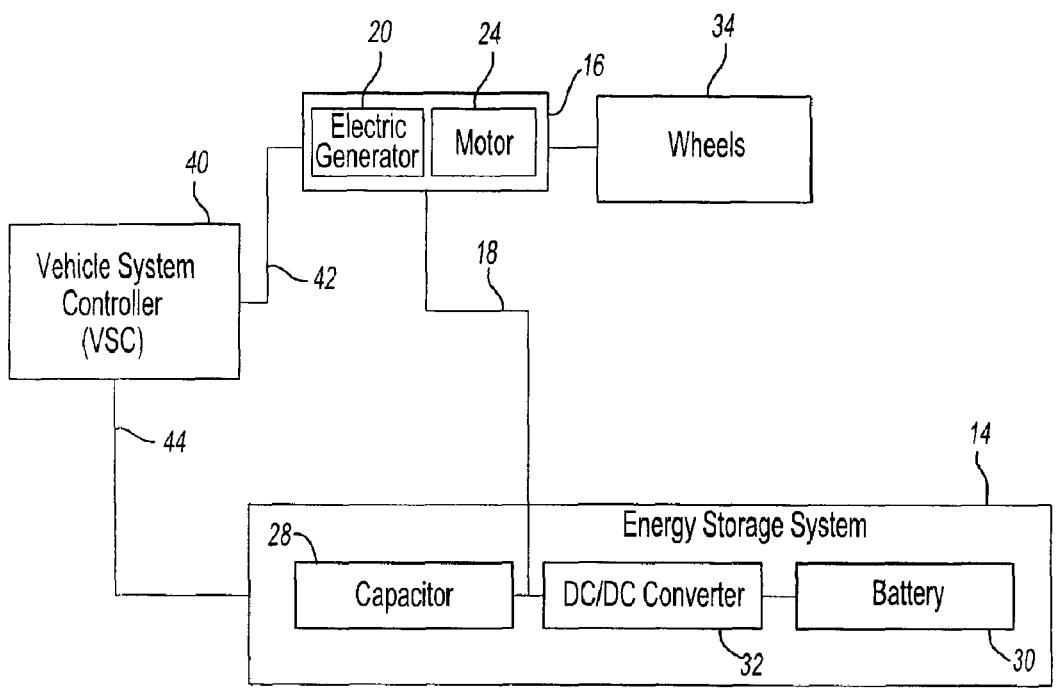
FIG. 2 illustrates exemplary configuration for the powertrain and the electric energy storage system (ESS)

FIG. 2 illustrate one embodiment of the invention wherein powertrain 16 includes an electric power generator unit 20 and a traction motor 24, and wherein ESS 14 includes capacitor 28, battery 30, and DC/DC converter 32. Traction motor 24 receives electric power from generator unit 20 and/or ESS 14 for driving wheels 34.

Electric generator unit 20 generates electric power, such as with a fuel cell or an engine/generator. Some or all of the electric power flows to motor 24 and/or to ESS 14 over electric bus 18. Likewise, some or all of the electric energy stored by the ESS 14 flows to powertrain 16 over bus 18. In this manner, electric power can flow between powertrain 16 and ESS 14.

Vehicle system controller (VSC) 40 controls operation of powertrain 16 and ESS 14. Communication buses 42 and 44 extend from VSC 40 to ESS 14 and powertrain 16 and control signals are transferred therebetween. This allows VSC 24 to determine whether the powertrain 16 is to accept or provide power to and from bus 18 and whether battery 30 is to accept or provide power to and from bus 18, as described below.

In one aspect of the present invention, power generator unit 20 is controlled such that $P^*_{gen}=P^*_{ess}+P^*_{mot}$, wherein $P^*_{gen}$ is the power demand of electric generator unit 20, $P^*_{ess}$ is the power demand of ESS 14, and $P^*_{mot}$ is the power demand of traction motor 24. The power demand of ESS 14 is further defined as $P^*_{ess}=P^*_{cap}+P^*_{bat}$, wherein $P^*_{cap}$ is the power demand of capacitor 28 and $P^*_{bat}$ is the power demand of battery 30.

In general, with load-following strategy for power and torque control, VSC 40 estimates motor power demand ($P^*_{mot}$) based on a driver's torque demand—other vehicle operating parameters can also be included. VSC 40 controls the power output of electric generator unit 20 ($P_{gen}$) to meet the motor power demand ($P^*_{mot}$).

The transient nature of vehicle operation, and in particular, the constantly changing motor power demand ($P^*_{mot}$) make it difficult to quickly balance power from electric generator unit 20 with the power to the motor ($P_{mot}$). An imbalance occurs where the power output of generator unit 20 is either more or less than the motor power consumption. ESS 14 acts as a buffer to make up for the imbalance of power by providing power when $P_{gen}$ is less than $P_{mot}$ and by taking power when $P_{gen}$ is greater than $P_{mot}$.

Other power imbalances can arise during starting of generator unit 20 and regenerative braking of motor 24. At startup, the driver may demand power for driving vehicle, which generator unit 20 is unable to immediately provide. ESS 14 can make up for a lack of immediate power by discharging to motor 24. Regenerative braking is another condition where motor 24 is producing power rather than consuming power. The power produced can be consumed by vehicle auxiliary loads (not shown) and, in accordance with the present invention, received by ESS 14 if ESS 14 is not fully charged.

Capacitor 28, connected directly to electric power generator unit 20 and motor 24 over bus 18, serves primarily as a power buffer by compensating for transient charge and discharge spikes between generator unit 20 and motor 24. Battery 30 is connected to bus 18 by DC/DC converter 32. It serves as an energy buffer for either dumping surplus energy from generator unit 20, motor 24, and capacitor 28 when the charge of capacitor 28 is high or the power rating of capacitor 28 is not high enough to meet the ESS power demand ($P^*_{ess}$), or for delivering energy back to generator unit 20, motor 24, and capacitor 28 when the charge of capacitor 28 is low or the power rating of capacitor 28 is not high enough to meet the ESS power demand ($P^*_{ess}$).

The ability of ESS 14 to receive or discharge power is determined based on its power demand (P*ess). The ESS power demand values (P*ess) can be positive or negative. Positive power demand values indicate a need for ESS 14 to receive energy. Negative power demand values indicate a need for ESS 14 to discharge electric energy. The power demand needs of ESS 14 are included in the vehicle control equation: $P^*gen=P^*_{ess}+P^*_{mot}$.

VSC 40 transfers command signals over signal flow path 42 to control electric generator unit 20 and motor 24. VSC 40 transfers command signals over signal flow path 44 to control DC/DC converter 32. Additional signals are transferred over signal flow paths 42 and 44 to monitor the operation of electric generator unit 20, motor 24, capacitor 28, battery 30, and DC/DC converter 32.

Capacitor 28 is a typical high voltage capacitor commonly used in electric vehicles. It is an electric energy storage device of low energy density, high power density, and high durability and provides fast charging/discharging. Battery 30 is a typical high voltage battery commonly used in electric vehicles. It is an electric storage device of high energy density, low power density, and low durability and provides slow charging/discharging.

The invention takes advantage of the properties by maximizing charging and discharging of capacitor 28 so that response time of ESS 14 is short. At the same time, increase reliance on capacitor 28 allows the charging and discharging of battery 30 to be limited, so that battery size, and therefore cost, can be lowered and usage prolonged.

Figure 3:
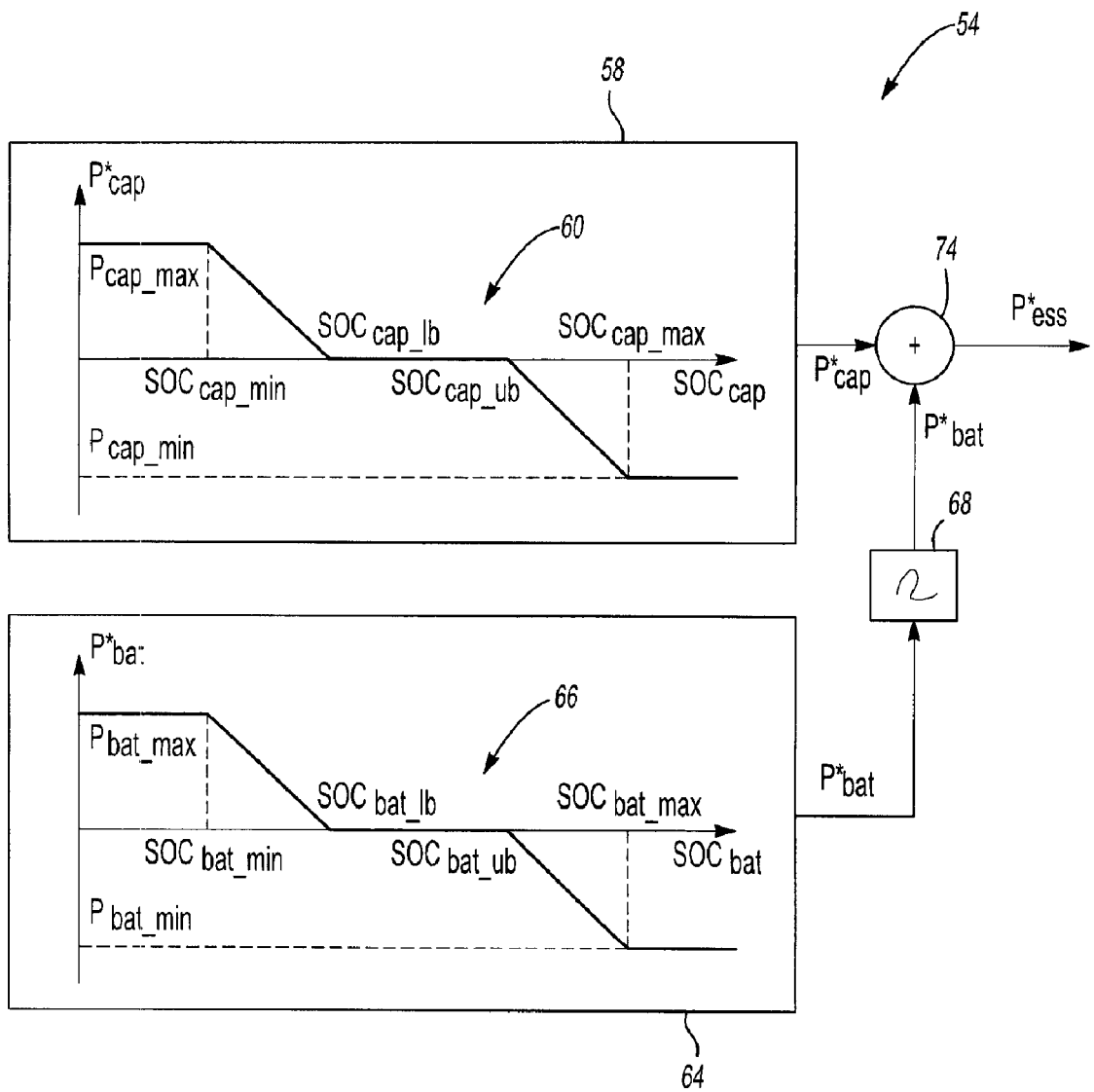
FIG. 3 illustrates a flow chart for determining a power demand for the ESS.

The graph 54 in FIG. 3 illustrates how to monitor the capability of ESS 14 to receive or discharge power. Graph 54 is one means for establishing the ESS power demand value ($p^*_{ess}$) based on the respective SOC values of capacitor 28 ($SOC_{cap}$) and battery 30 $SOC_{bat}$) calculated by VSC 40. Graph 58 shows capacitor power demand curve 60 and graph 64 shows battery power demand curve 66.

Capacitor 28 is preferably maintained within a neutral charge band defined by $SOC_{cap\_lb}$ (lower band) and $SOC_{cap\_up}$ (upper band). If the capacitor SOC deviates beyond this range, a need arises for charging or discharging capacitor 28. If the capacitor SOC is within the range, then capacitor 28 acts as a power buffer as described above, wherein capacitor 28 receives or discharges power to make up an imbalance in power output of generator unit 20 and power consumption and power production of motor 24.

VSC 40 determines a need for discharging capacitor 28 and calculates a corresponding negative value for $P^*_{cap}$ if its SOC is greater than $SOC_{cap\_ub}$. VSC 40 determines a need for charging capacitor 28 and calculates a corresponding positive value for $P^*_{cap}$ if its SOC is less than $SOC_{cap\_lb}$. $P^*_{cap}$ is zero if $SOC_{cap}$ is within the neutral charge band, which indicates no need for charging or discharging of capacitor. Capacitor 28 then can be used to buffer power.

The power demand values corresponding with the rate of charging and discharging capacitor 28 are variable. Power demand curve 60 gradually increases negatively from zero at $SOC_{cap\_ub}$ to a maximum negative $P_{cap\_min}$ at maximum capacitor SOC ($SOC_{cap\_max}$). Power demand curve 60 gradually increases positively from zero at $SOC_{cap\_lb}$ to a maximum positive $P_{cap\_max}$ at minimum capacitor SOC ($SOC_{cap\_min}$).

$P^*_{bat}$ is determined in a manner similar to the determination of $P^*_{cap}$. Battery 30 is preferably maintained within a neutral charge band defined by $SOC_{bat\_lb}$ (lower band) and $SOC_{bat\_up}$ (upper band). If the battery SOC deviates beyond this range, a need arises for charging or discharging battery 30. If the battery SOC is within the range, then battery 30 is sufficiently charged and the battery can additionally act as the power buffer described above. Preferably, the use of battery 30 as a power buffer is limited to conditions where operation of capacitor 28 is insufficient to buffer power so that charging and discharge of battery 30 is limited.

VSC 40 determines a need for discharging battery 30 and calculates a corresponding negative value for $P^*_{bat}$ if its SOC is greater than $SOC_{bat\_ub}$. VSC 40 determines a need for charging battery and calculates a corresponding positive value for $P^*_{bat}$ if its SOC is less than $SOC_{bat\_lb}$. $P^*_{bat}$ is zero if $SOC_{cap}$ is within the neutral charge band to indicate no need for charging or discharging of battery and to indicate that battery 30 can be used to buffer power.

The power demand values corresponding with the rate of charging and discharging of battery 30 are variable. Power demand curve 66 gradually increases negatively from zero at $SOC_{bat\_ub}$ to a maximum negative $P_{bat\_min}$ at maximum capacitor SOC ($SOC_{bat\_max}$). The power demand curve gradually increases positively from zero at $SOC_{bat\_lb}$ to a maximum positive $P_{bat\_max}$ at minimum battery SOC ($SOC_{bat\_min}$).

VSC 40 preferably modifies the $P^*_{bat}$ value based on the efficiency of DC/DC converter 32, as shown in box 68. This is done to compensate for energy losses due to DC/DC converter 32 passing energy to battery 30 or receiving energy from battery 30. The modified $P^*_{bat}$ value, for purposes of clarity, is still referred to as $P^*_{bat}$.

Graphs 58 and 64 are merely an exemplary means for determining $P^*_{cap}$ and $P^*_{bat}$ from the respective SOC values and are not intended to limit the scope of the present invention. Algorithms, fuzzy logic, neural networks, and the like could also be used to determine $P^*_{cap}$ and $P^*_{bat}$.

The value for $P^*_{cap}$ and the modified value for $P^*_{bat}$ are outputted to summer 74. The output of summer 74 corresponds with the total ESS power demand ($P^*_{ess} = P^*_{cap} + P^*_{bat}$).

FIG. 3 relates to one means for determining the ESS power demand value ($P^*_{ess}$) from the SOC of battery 30 and capacitor 28. $P^*_{ess}$ can also be determined based on the operating conditions of electric generator unit 20 and motor 24.

Electric generator unit 20 may not supply sufficient power to meet the motor power demand ($P^*_{mot}$), in which case VSC 40 may assign a negative $P^*_{ess}$ value and thereby control ESS 14 to discharge power to motor to make up to the lack of power provided by electric generator unit 20. Preferably, the assigned negative value is limited such that battery 30 and capacitor 28 are not discharged beyond their respective SOC low limit values ($SOC_{cap\_min}$ and $SOC_{bat\_min}$).

Likewise, traction motor 24 may be generate electric energy during a regenerative braking event, in which case VSC 40 may assign a positive ESS value and thereby control ESS 14 to receive at least some of the power generated by the regenerative braking of traction motor 24. Preferably, the assigned positive value is limited such that battery 30 and capacitor 28 are not charged beyond their respective SOC upper limit values ($SOC_{cap\_max}$ and $SOC_{bat\_max}$).

Figure 4:
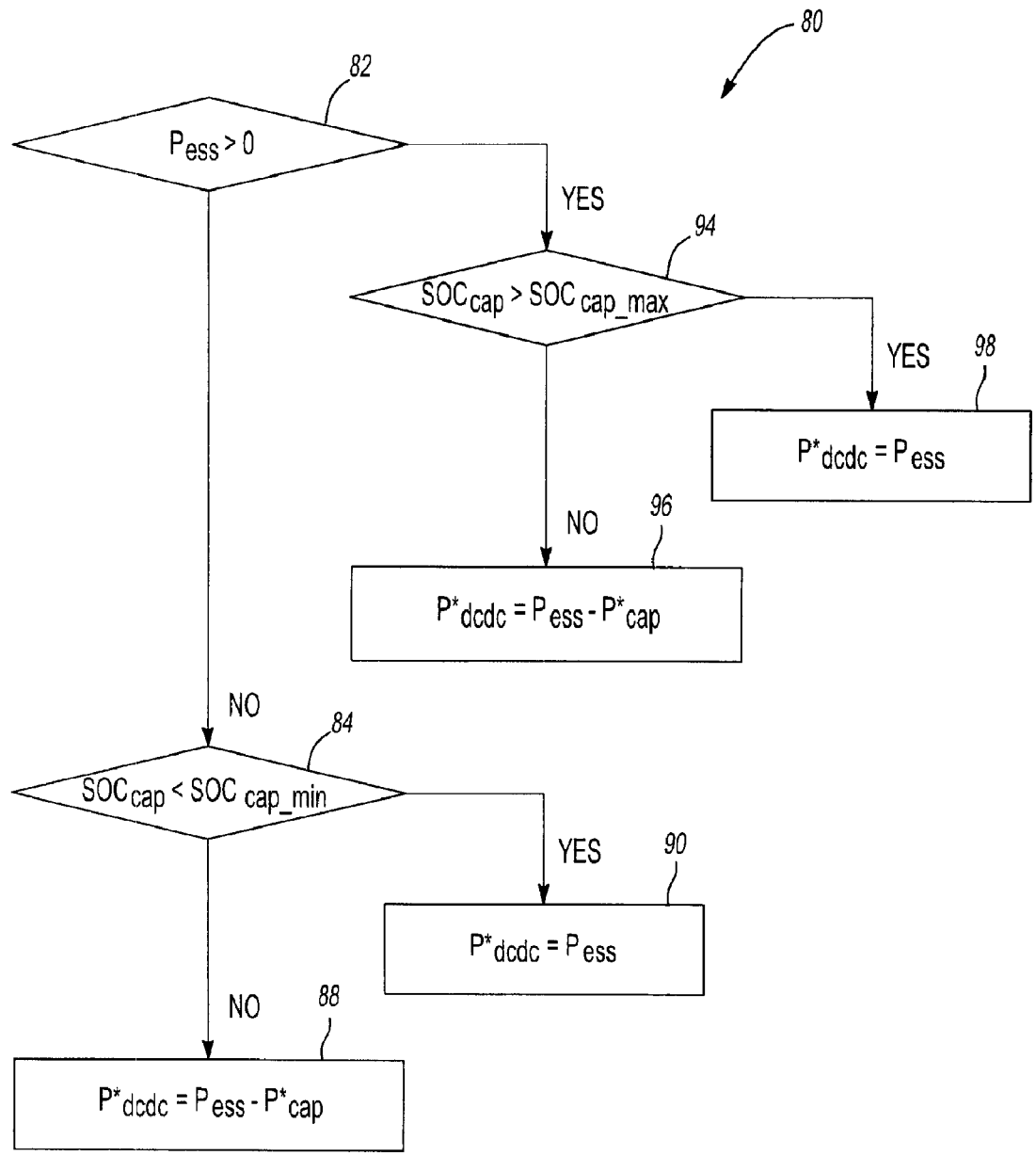
FIG. 4 illustrates a flow chart for controlling a DC/DC converter of the ESS.

FIG. 4 illustrates a flowchart 80 for controlling DC/DC converter 32 according to the ESS power flow ($P_{ess}$). The control of ESS consists of at least one of controlling electric generator unit 20 and motor 24 to produce power, controlling motor 24 to consume power, and controlling DC/DC converter 32 with DC/DC converter control signal (P*dcdc) to permit charging and discharging of battery 30. The control of ESS 14 maximizes use of capacitor 28 relative to use of battery 30 to take advantage of its improved performance characteristics relative to battery 30.

$P_{ess}$ is determined at decision block 82. If block 82 indicates $P_{ess}$ is negative, one or both of capacitor 28 and battery 30 will be discharged. At decision block 84 it is determined whether capacitor 28 will be discharged based on whether capacitor SOC ($SOC_{cap}$) is greater than or less than its minimum SOC ($SOC_{cap\_min}$). If $SOC_{cap}$ is greater than or equal to $SOC_{cap\_min}$, DC/DC converter is controlled at block 88 so that both capacitor 28 and battery 30 can be discharged. VSC 40 sets the DC/DC converter command signal (P*dcdc) at block 88 so that DC/DC converter 32 limits battery 30 discharge to a difference between the ESS power flow ($P_{ess}$) and power demand of capacitor ($P^*_{cap}$). The power demand of capacitor ($P^*_{cap}$) corresponds with the difference between the minimum capacitor SOC ($SOC_{cap\_min}$) and the actual capacitor SOC ($SOC_{cap}$). Limiting battery 30 discharge in this manner maximizes use of capacitor 28 to take advantage of its improved characteristics relative to battery 30.

If $SOC_{cap}$ is less than $SOC_{cap\_min}$, VSC 40 controls DC/DC converter 32 so that only battery 30 can be discharged. VSC 40 sets the DC/DC converter command signal (P*dcdc) at action block 90 so that DC/DC converter 32 sets the battery 30 discharge below its low limit ($SOC_{cap\_min}$) Limiting capacitor 28 discharge in this manner limits capacitor 28 degradation, which may otherwise occur if capacitor 28 is discharged too much.

If block 82 indicates $P_{ess}$ is positive, one or both of capacitor 28 and battery 30 is to be charged. It is determined at decision block 94 whether battery 30 and capacitor 28 are to be charged based on whether capacitor SOC ($SOC_{cap}$) is greater than or less than its maximum SOC ($SOC_{cap\_max}$).

It $SOC_{cap}$ is less than $SOC_{cap\_max}$, VSC 40 DC/DC converter 32 is controlled at 96 so that both capacitor 28 and battery 30 can be charged. VSC 40 sets the DC/DC converter command signal (P*dcdc) so that DC/DC converter 32 limits battery 30 charge to a difference between the ESS power flow ($P_{ess}$) and power demand of capacitor ($P^*_{cap}$). The power demand of capacitor ($P^*_{cap}$) corresponds to the difference between the maximum capacitor SOC ($SOC_{cap\_max}$) and the actual capacitor SOC ($SOC_{cap}$). Limiting battery 30 charge so that capacitor 28 is charged first maximizes capacitor 28 usage to take advantage of its improved characteristics relative to battery 30.

If $SOC_{cap\_max}$ is less than $SOC_{cap}$, VSC 40 controls DC/DC converter 32 at action block 98 so that only battery 30 can be charged. VSC 40 sets the DC/DC converter command signal (P*dcdc) so that DC/DC converter 32 sets the battery charge to cover the entire the ESS power flow ($P_{ess}$), thereby limiting any charging of capacitor above its max limit ($SOC_{cap\_max}$). Limiting capacitor 28 charge in this manner limits capacitor 28 degradation, which may otherwise occur if capacitor 28 is charged too much.

While the best mode for carrying out the invention has been described in detail, those familiar with the art to which this invention relates will recognize various alternative designs and embodiments for practicing the invention as defined by the following claims.

What is claimed is:

1. A method for controlling operation of a vehicle having an electric powertrain and an electric energy storage system (ESS) in communication with the electric powertrain, the ESS including a capacitor, a battery, and a DC/DC converter, the method comprising:

monitoring a state of charge (SOC) of the capacitor;

controlling the DC/DC converter to allow only the capacitor to discharge to the electric powertrain when the capacitor SOC is greater than or equal to a first threshold;

controlling the DC/DC converter to allow both the capacitor and battery to discharge to the electric powertrain when the capacitor SOC is less than the first threshold; and controlling the DC/DC converter to allow only the battery to discharge to the electric powertrain when the capacitor SOC is less than a second threshold.

2. The method of claim 1 further comprising controlling power flow between the electric powertrain and the ESS by controlling only the DC/DC converter and the electric powertrain.

3. The method of claim 1 further comprising calculating an ESS power demand for the ESS and a driving power demand, wherein the method further comprises controlling the electric powertrain based on the driving power demand and ESS power demand.

4. The method of claim 3 wherein the calculated ESS power demand is based on both the capacitor SOC and battery state of charge (SOC).

5. The method of claim 4 wherein the ESS power demand is positive to indicate charging the ESS, wherein the electric powertrain is controlled to provide power to the ESS that is equal to the positive ESS power demand for charging the ESS.

6. The method of claim 5 further comprising calculating the positive ESS power demand if one or both of the capacitor SOC and battery SOC is less than a predefined SOC low limit.

7. The method of claim 4 wherein the ESS power demand is negative to indicate discharging the ESS, wherein the electric powertrain is controlled to receive power from the ESS that is equal to the negative ESS power demand for discharging the ESS.

8. The method of claim 7 further comprising calculating the negative ESS power demand if one or both of the capacitor SOC and battery SOC is greater than a predefined SOC high limit.

9. The method of claim 1 further comprising controlling the DC/DC converter to allow the electric powertrain to charge only the capacitor when the capacitor SOC is less than the first threshold.

10. The method of claim 1 further comprising controlling the DC/DC converter to allow the electric powertrain to charge both the capacitor and battery when the capacitor SOC is greater than or equal to the second threshold.

11. The method of claim 1 further comprising controlling the DC/DC converter to allow the electric powertrain to charge only the battery when the capacitor SOC is greater than the first threshold.

12. A system for use with an electric powertrain of a vehicle, comprising:
   an ESS in communication with the electric powertrain and including a capacitor, a battery, and a DC/DC converter; and
   a controller operable for:
      (i) monitoring the stage of charge (SOC) of the capacitor;
      (ii) controlling the DC/DC converter to allow only the capacitor to discharge to the electric powertrain when the capacitor SOC is greater than or equal to a first threshold;
      (iii) controlling the DC/DC converter to allow both the capacitor and battery to discharge to the electric powertrain when the capacitor SOC is less than the first threshold; and
      (iv) controlling the DC/DC converter to allow only the battery to discharge to the electric powertrain when the capacitor SOC is less than a second threshold.

13. The system of claim 12 wherein the controller calculates an ESS power demand to be positive such that power is to flow from the electric powertrain to the ESS for charging the ESS if one or both of a capacitor SOC and a battery SOC is less than a predefined SOC low limit, the SOC low limit of the capacitor being the same as the minimum SOC, wherein the electric powertrain is controlled to provide power for charging the ESS that is equal to the positive ESS power demand.

14. The system of claim 13 wherein the controller calculates the ESS power demand to be negative such that power flows from the ESS to the electric powertrain for discharging the ESS if one or both of the capacitor SOC and the battery SOC is greater than a predefined SOC high limit, the predefined SOC high limit of the capacitor being the same as the maximum SOC, wherein the electric powertrain is controlled to receive power for discharging the ESS that is equal to the negative ESS power demand.

15. For use with a vehicle-based electric powertrain connected serially in order to a capacitor, a DC/DC converter, and a battery, a method of controlling energy flow comprising:
   discharging only the capacitor to the powertrain when capacitor SOC is greater than a first threshold
   discharging the capacitor and battery to the powertrain when capacitor SOC is less than the first threshold; and
   discharging only the battery to the powertrain when capacitor SOC is less than a second threshold.

* * * * *